(12) United States Patent
Okamoto et al.

(10) Patent No.: US 11,107,654 B2
(45) Date of Patent: Aug. 31, 2021

(54) ELECTRICAL CONNECTION BOX

(71) Applicant: Sumitomo Wiring Systems, Ltd., Mie (JP)

(72) Inventors: Noriko Okamoto, Mie (JP); Akihiro Oda, Mie (JP); Masakazu Okumura, Mie (JP); Ryoma Hamada, Mie (JP); Tatsuya Daidoji, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/704,726

(22) Filed: Dec. 5, 2019

(65) Prior Publication Data

US 2020/0185182 A1    Jun. 11, 2020

(30) Foreign Application Priority Data

Dec. 7, 2018  (JP) .............................. JP2018-230278

(51) Int. Cl.

| | |
|---|---|
| *H01H 85/20* | (2006.01) |
| *H01R 13/688* | (2011.01) |
| *H01R 13/631* | (2006.01) |
| *H01R 33/06* | (2006.01) |
| *B60R 16/023* | (2006.01) |
| *H01R 33/88* | (2006.01) |

(52) U.S. Cl.
CPC ......... *H01H 85/20* (2013.01); *B60R 16/0238* (2013.01); *H01R 13/631* (2013.01); *H01R 13/688* (2013.01); *H01R 33/06* (2013.01); *H01R 33/88* (2013.01); *H01H 2085/209* (2013.01); *H01H 2085/2085* (2013.01); *H01R 2201/26* (2013.01)

(58) Field of Classification Search
CPC ........... H01H 85/20; H01H 2085/2085; H01H 2085/209; B60R 16/0238; H01R 33/06; H01R 33/88; H01R 13/61; H01R 2201/26
See application file for complete search history.

(56) References Cited

U.S. PATENT DOCUMENTS

2018/0201208 A1* 7/2018 Wortberg ............ B60R 16/0315

FOREIGN PATENT DOCUMENTS

| DE | 202014101705 | * | 5/2014 | ......... H01H 85/2035 |
|---|---|---|---|---|
| JP | H9-283004 A | | 10/1997 | |

* cited by examiner

*Primary Examiner* — Briggitte R. Hammond
(74) *Attorney, Agent, or Firm* — Honigman LLP (57) ABSTRACT

Provided is an electrical connection box in which a greater number of fuses can be inserted while suppressing an increase in size. An electrical connection box for a vehicle includes: an insertion housing that has a rectangular open port on one side and in which a plurality of rectangular insertion holes into which fuses are to be respectively inserted are provided facing the open port; a first insertion hole row in which a plurality of the insertion holes are provided side by side in a lengthwise direction of the open port, with long sides of the insertion holes adjacent to each other; and a second insertion hole row in which a plurality of the insertion holes are provided side by side in the lengthwise direction of the open port, with short sides of the insertion holes adjacent to each other.

3 Claims, 7 Drawing Sheets

ELECTRICAL CONNECTION BOX

CROSS-REFERENCE TO RELATED APPLICATIONS

This application claims priority of Japanese Patent Application No. JP 2018-230278 filed on Dec. 7, 2018, the contents of which are incorporated herein.

TECHNICAL FIELD

The present disclosure relates to an electrical connection box to be used in a vehicle.

BACKGROUND

Conventionally, an electrical connection box into which fuses are inserted has been mounted in a vehicle.

JP H9-283004A discloses an electrical connection box including a box main body provided with: multiple fuse fitting portions into which fuses are to be fit; multiple fusible link fitting portions into which fusible links are to be fit; and a main fusible link fitting portion into which a main fusible link is to be fit, wherein the fuse fitting portions, the fusible link fitting portions, and the main fusible link fitting portion are sequentially arranged in the stated order on one surface of the box main body.

JP H9-283004A is an example of related art.

In recent years, due to the number of electronic apparatuses mounted in a vehicle increasing, the number of fuses needed to control the electronic apparatuses has also increased. However, the amount of space in which the electrical connection box can be mounted is limited. Accordingly, it is necessary to devise a method according to which a greater number of fuses can be inserted while suppressing an increase in the size of the electrical connection box.

However, in the above-described electrical connection box, a case is merely disclosed in which one box body includes multiple types of fuse fitting portions corresponding to multiple types of fuses, and the above-described problem cannot be solved.

The present disclosure has been made in view of these circumstances, and it is an object thereof to provide an electrical connection box into which a greater number of fuses can be inserted while suppressing an increase in size.

SUMMARY

An electrical connection box according to one aspect of the present disclosure is an electrical connection box for a vehicle, including an insertion housing that has a rectangular open port on one side and in which a plurality of rectangular insertion holes into which fuses are to be respectively inserted are provided facing the open port, the electrical connection box including: a first insertion hole row in which a plurality of the insertion holes are provided side by side in a lengthwise direction of the open port, with long sides of the insertion holes adjacent to each other; and a second insertion hole row in which a plurality of the insertion holes are provided side by side in the lengthwise direction of the open port, with short sides of the insertion holes adjacent to each other.

Advantageous Effects of Disclosure

According to an aspect of the present disclosure, it is possible to insert a greater number of fuses while suppressing an increase in the size of the electrical connection box.

DETAILED DESCRIPTION OF PREFERRED EMBODIMENTS

First, embodiments of the present disclosure will be listed and described. At least parts of the embodiments described hereinafter may be combined as needed.

An electrical connection box according to an aspect of the present disclosure is an electrical connection box for a vehicle, including an insertion housing that has a rectangular open port on one side and in which a plurality of rectangular insertion holes into which fuses are to be respectively inserted are provided facing the open port, the electrical connection box including: a first insertion hole row in which a plurality of the insertion holes are provided side by side in a lengthwise direction of the open port, with long sides of the insertion holes adjacent to each other; and a second insertion hole row in which a plurality of the insertion holes are provided side by side in the lengthwise direction of the open port, with short sides of the insertion holes adjacent to each other.

In the present aspect, the first insertion hole row and the second insertion hole row are both present in the open port of the insertion housing. Accordingly, an increase in the dimension in the short direction of the open port can be suppressed compared to a case in which only the first insertion hole row is provided.

In an electrical connection box according to an aspect of the present disclosure, a substrate arranged opposing one wall portion surrounding the open port is included outside of the insertion housing, the first insertion hole row is provided at a position close to the substrate, and the second insertion hole row is provided at a position far from the substrate.

In the present aspect, the first insertion hole row is provided at a position close to the substrate, and the second insertion hole row is provided at a position far from the substrate. That is, the second insertion hole row is provided farthest from the substrate. Accordingly, it is possible to achieve convenience in the manufacture of the electrical connection box.

An electrical connection box according to an aspect of the present disclosure includes: through holes that are provided in an opposite-side surface of the insertion housing that is on a side opposite to that of the open port, and allows the inside and outside of the insertion housing to be in communication;

a plurality of fuse terminals that have end portions on one side inserted into the insertion housing through the through holes, and that connect the fuses to the substrate; and guiding portions that are provided on the opposite-side surface and are configured to guide insertion of the fuse terminals.

In the present aspect, the guiding portions for guiding the insertion of the fuse terminals into the insertion housing are provided on the opposite-side surface. Accordingly, during work for assembling the electrical connection box, a worker can easily insert the fuse terminals into the through holes by using the guiding portions.

An electrical connection box according to an aspect of the present disclosure includes a flat plate portion that covers another wall portion opposing the one wall portion of the insertion housing. In a short direction of the open port, a distance from the other wall portion to the flat plate portion is shorter than a distance from the one wall portion to the substrate.

In the present aspect, in the short direction of the open port, the distance from the one wall portion to the substrate is longer than the distance from the other wall portion to the flat plate portion. Thus, since the gap from the one wall portion to the substrate is wide, when performing work for assembling the electrical connection box, the worker can easily check the state of the connection between the fuse terminal and the substrate and the like with his or her eyes via the gap.

The present disclosure will be described specifically with reference to the drawings indicating the embodiment. The electrical connection box according to the embodiment of the present disclosure will be described hereinafter with reference to the drawings. Note that the present disclosure is not limited to these illustrative examples, but is defined by the claims. Meanings equivalent to the claims and all modifications within the claims are intended to be included.

Figure 1:
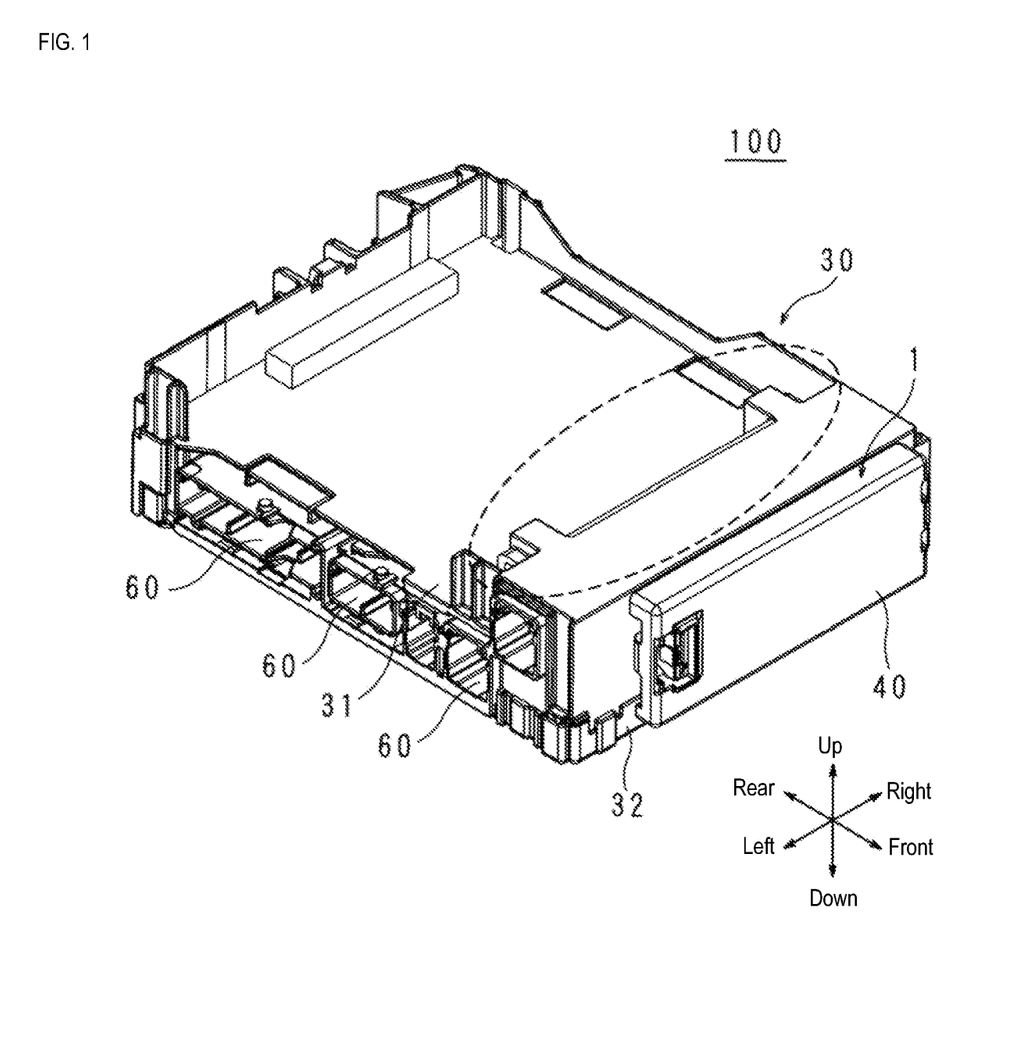
FIG. 1 is a perspective view showing the appearance of an electrical connection box according to the present embodiment.
Figure 2:
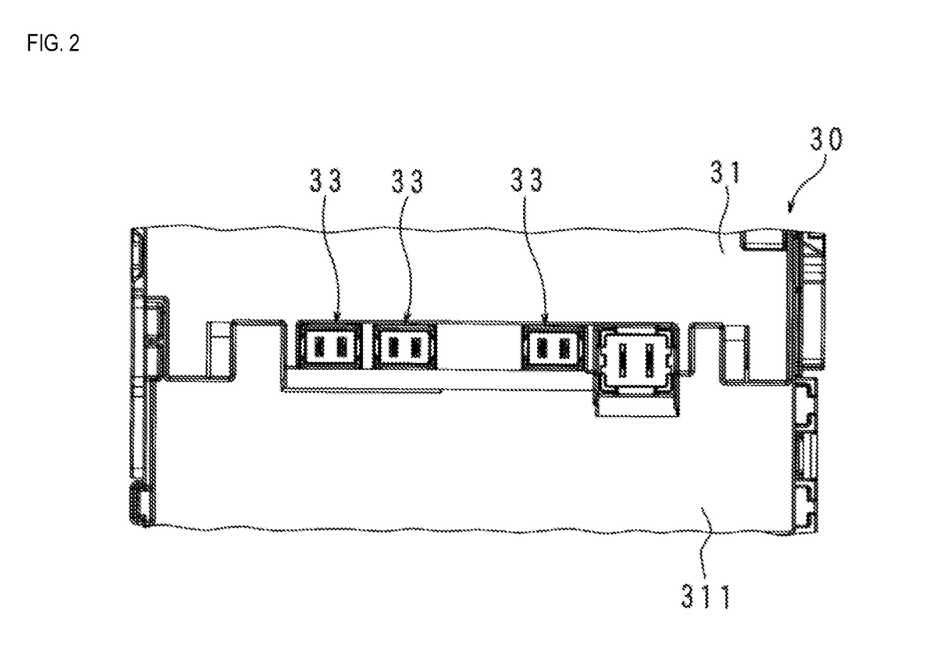
FIG. 2 is an enlarged view of a portion surrounded by a broken line in FIG. 1.

FIG. 1 is a perspective view showing the appearance of an electrical connection box 100 according to the present embodiment, and FIG. 2 is an enlarged view of a portion surrounded by a broken line in FIG. 1.

The electrical connection box 100 is a so-called fuse box into which fuses are to be inserted, and is to be mounted in a vehicle.

The electrical connection box 100 includes: a case member 30 that houses a substrate on which electrical components or the like are mounted; a fuse module 1 into which fuses are to be inserted; and a lid member 40 that covers an open port of the fuse module 1.

In the present embodiment, for the sake of convenience, "front", "rear", "left", "right", "up", and "down" of the electrical connection box 100 are defined according to the front-rear, left-right, and up-down directions shown in FIGS. 1 and 2. Hereinafter, description will be given using the thus-defined front-rear, left-right, and up-down directions.

The case member 30 includes: an upper case portion 31 and a lower case portion 32, and the front end portion of the upper case portion 31 covers a portion of the fuse module 1. The upper case portion 31 has a level difference, and the dimension of the front end portion is greater than that of the other portion in the up-down direction.

Also, in the upper case portion 31, multiple insertion ports 33 into which first fuses (not shown) are to be inserted are formed in the portion excluding the front-side end portion. The first fuses are connected to the substrate via later-described FL terminals 14 (see FIG. 6). Note that the electrical connection box 100 is provided with multiple connector terminals 60 on the left and right side surfaces.

Figure 3:
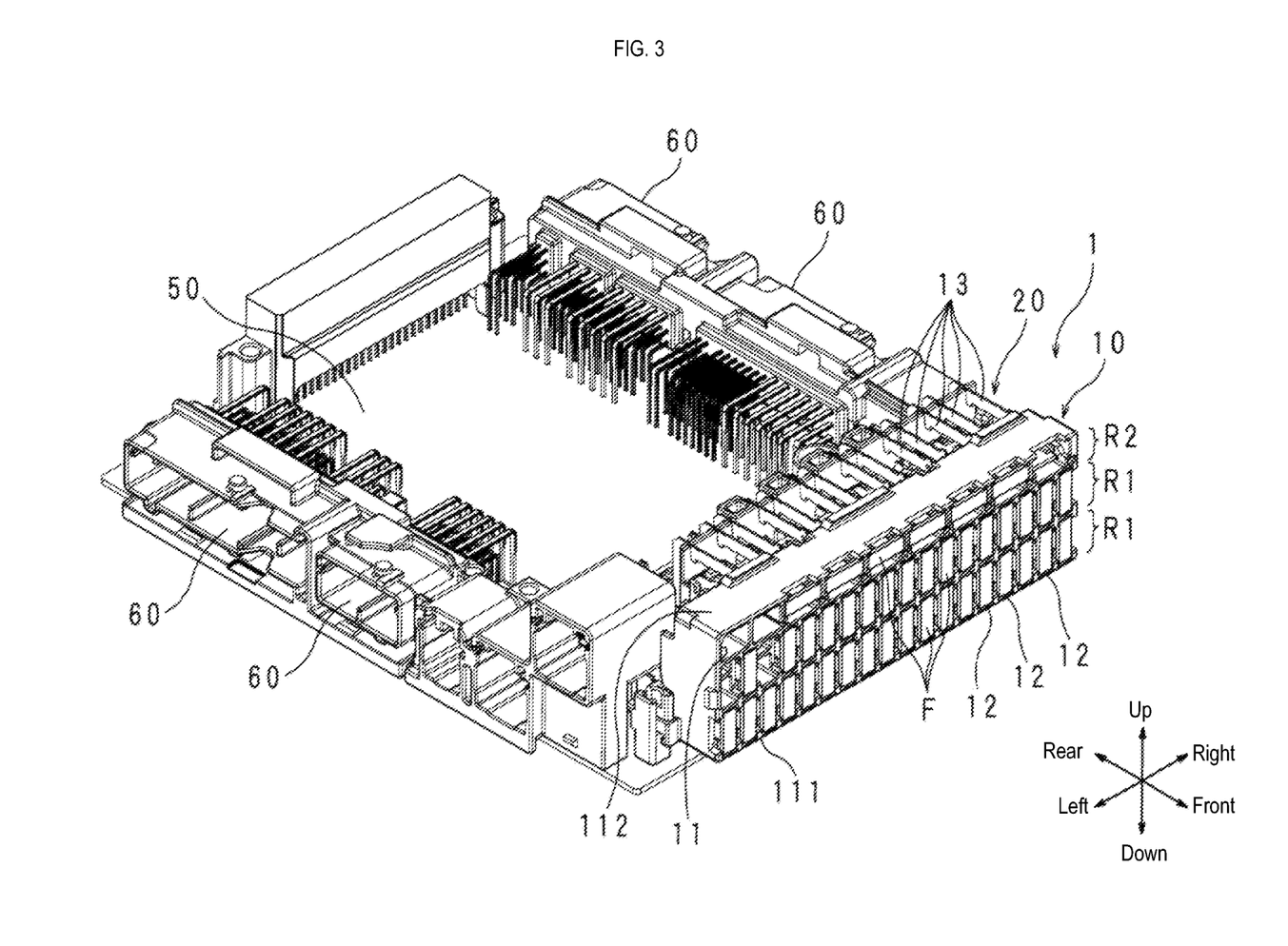
FIG. 3 is a perspective view showing a state in which a case member and a lid member have been omitted in the electrical connection box according to the present embodiment.

FIG. 3 is a perspective view showing a state in which the case member 30 and the lid member 40 are omitted in the electrical connection box 100 according to the present embodiment.

The fuse module 1 includes: an insertion housing 10 into which multiple second fuses F are to be inserted; multiple fuse terminals 13 that connect the second fuses F inserted into the insertion housing 10 and the substrate; and a holding member 20 that is a structural member for holding the fuse terminals 13. The upper case portion 31 includes a flat plate portion 311, and the insertion housing 10, the holding member 20, and the fuse terminal 13 are covered by the flat plate portion 311.

The first fuses and the second fuses F are different types of fuses. For example, the first fuses and the second fuses have different allowed currents, and differ in the amount of time it takes to melt and cut off the circuit.

The insertion housing 10 has a cuboid box shape whose entire surface on the front side is open. Rectangular insertion holes 12 into which the second fuses F are to be inserted are provided in the form of a matrix, for example, inside of the insertion housing 10. That is, the insertion holes 12 are exposed via the open port 11 on the front side of the insertion housing 10.

A substrate 50 is arranged below the insertion housing 10. Specifically, the substrate 50 is provided opposing the lower wall portion 111, near the lower wall portion 111 (one wall portion) located on the lower side of the four wall portions surrounding the open port 11 in the insertion housing 10. The substrate 50 is arranged parallel to the lower wall portion 111, space apart from the outer surface of the lower wall portion 111. The second fuses F inserted into the insertion holes 12 are connected to the substrate 50 by the fuse terminals 13.

The open port 11 is rectangular, and the multiple insertion holes 12 are arranged side by side in the lengthwise direction (left-right direction) of the open port 11 to form rows. The multiple insertion holes 12 form three rows in the short direction (up-down direction) of the open port 11. The three rows include first insertion hole rows R1 and a second insertion hole row R2, in which the directions of the insertion holes 12 are different from each other.

In the first insertion hole rows R1, the lengthwise directions of the insertion holes 12 are parallel to the short direction (up-down direction) of the open port 11, and the insertion holes 12 are arranged side by side in the lengthwise direction of the open port 11. That is, in the first insertion hole rows R1, the multiple insertion holes 12 are arranged side by side in the lengthwise direction of the open port 11 with their long sides adjacent to each other.

Also, in the second insertion hole row R2, the lengthwise directions of the insertion holes 12 intersect the short direction (up-down direction) of the open port 11, and the insertion holes 12 are arranged side by side in the lengthwise direction of the open port 11. That is, in the second insertion hole row R2, the multiple insertion holes 12 are arranged side by side in the lengthwise direction of the open port 11 with their short sides adjacent to each other.

That is, the first and second rows of the insertion holes 12 from the lower wall portion 111 side of the insertion housing 10 are the first insertion hole rows R1, and the third row of the insertion holes 12 from the lower wall portion 111 side is the second insertion hole row R2. In other words, the first insertion hole rows R1 are provided at positions close to the substrate 50, and the second insertion hole row R2 is provided at a position far away from the substrate 50.

Thus, due to the fact that there are three rows of insertion holes 12 in the short direction of the open port 11, a greater number of the second fuses F can be inserted into the electrical connection box 100 according to the present embodiment than in the case of including two rows.

Also, in the electrical connection box 100 according to the present embodiment, in one row (the second insertion hole row R2) of the three rows, the insertion holes 12 are provided such that their lengthwise directions intersect the short direction of the open port 11. Accordingly, compared to the case of using an arrangement in which the lengthwise directions of the insertion holes 12 are parallel to the short direction of the open port 11 in all three rows, it is possible to reduce the dimensions of the insertion housing 10 in the short direction of the open port 11, and it is possible to achieve compactness.

Figure 4:
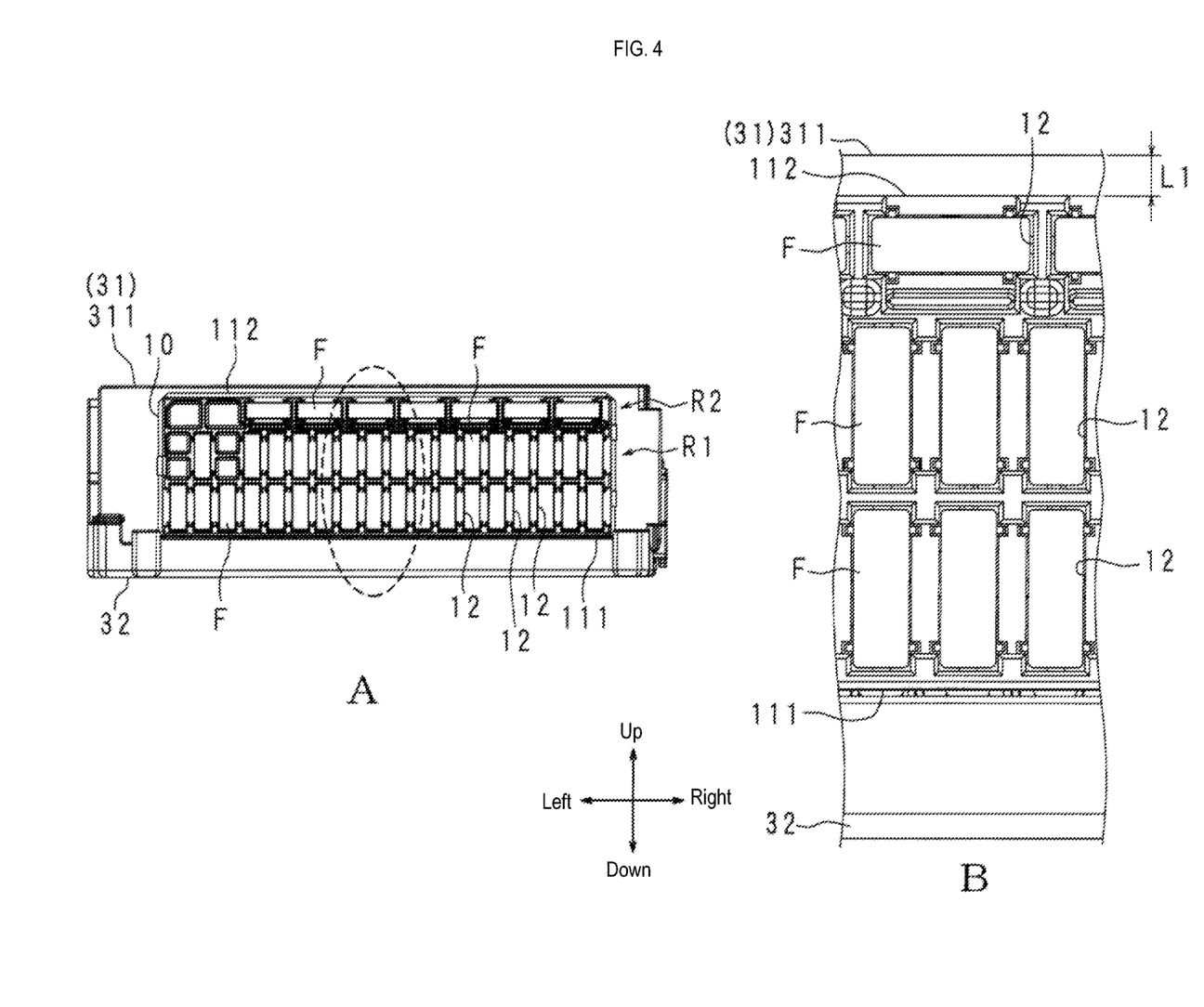
FIG. 4 is a front view of the electrical connection box according to the present embodiment.
Figure 5:
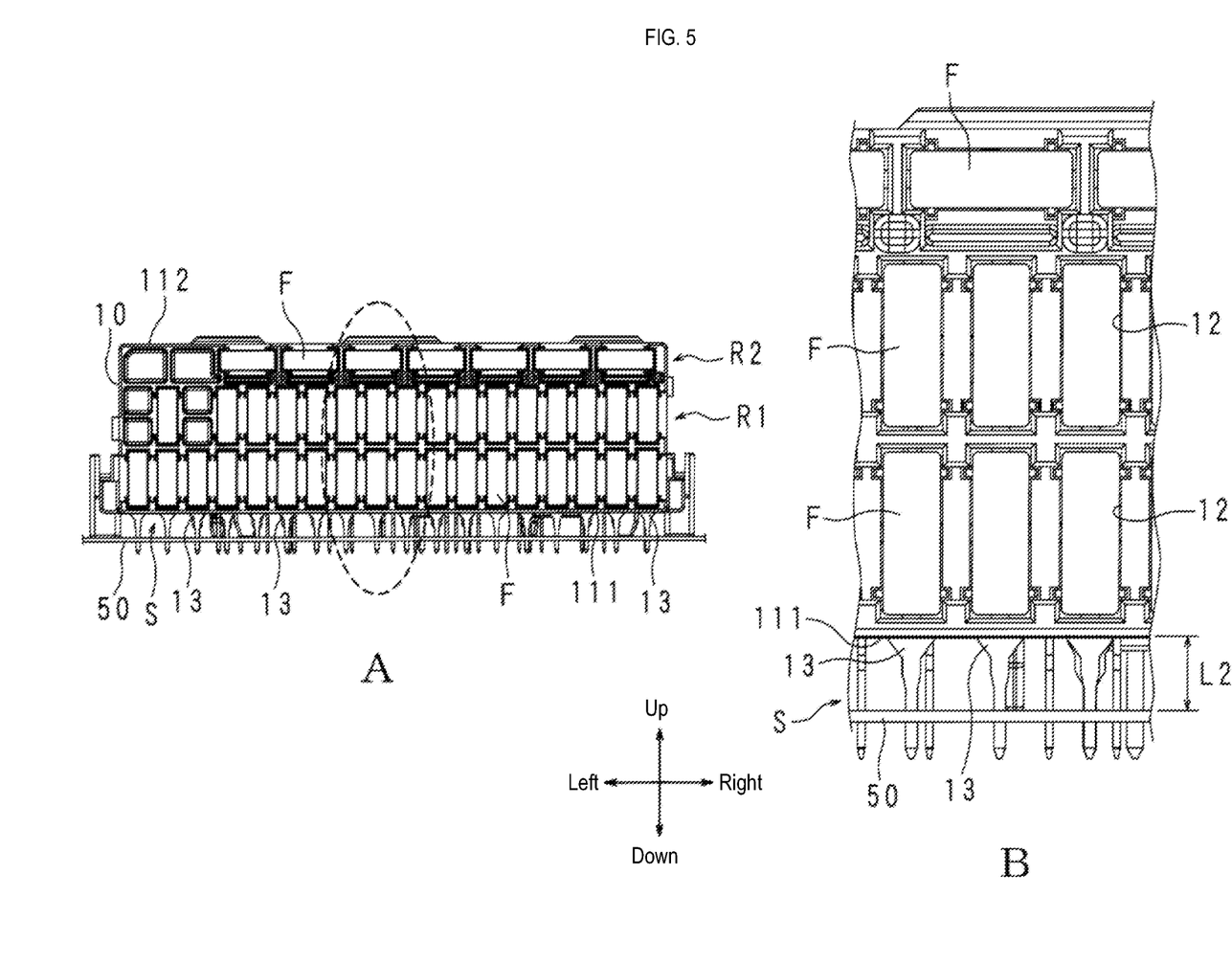
FIG. 5 is a front view of the electrical connection box according to the present embodiment in a state in which a case member has been omitted.

FIG. 4 is a front view of the electrical connection box 100 according to the present embodiment, and FIG. 5 is a front view of the electrical connection box 100 according to the present embodiment in a state in which the case member 30 has been omitted. In FIG. 4B, the portion surrounded by the broken line in FIG. 4A is shown enlarged, and in FIG. 5B, the portion surrounded by the broken line in FIG. 5A is shown enlarged.

In the electrical connection box 100 according to the present embodiment, in the short direction of the open port 11, the distance from the insertion housing 10 to the substrate 50 is greater than the distance from the insertion housing 10 to the upper case portion 31 (flat plate portion 311).

In the insertion housing 10, the upper wall portion 112 (other wall portion) opposing the lower wall portion 111 and the flat plate portion 311 of the case member 30 are parallel to each other. As shown in FIG. 4, the distance from the outer surface of the upper wall portion 112 to the outer surface of the flat plate portion 311 is denoted as L1. Also, as shown in FIG. 5, the dimension of the gap S between the outer surface of the lower wall portion 111 and the upper surface of the substrate 50 is denoted as L2. In the electrical connection box 100 according to the present embodiment, L2 is greater than L1.

Thus, the electrical connection box 100 according to the present embodiment has a greater distance from the outer surface of the lower wall portion 111 to the upper surface of the substrate 50, that is, the gap S is greater. Accordingly, during assembly of the electrical connection box 100, a worker can easily check the soldering of the substrate 50 and the end portions of the fuse terminals 13 via the gap S. Accordingly, it is possible to suppress production of a faulty product.

Also, the worker inserts the end portions of the fuse terminals 13 into the through holes 51 (see FIG. 6) of the substrate 50, and before performing soldering, the worker checks via the gap S whether or not the fuse terminals 13 have been correctly inserted into the through holes 51. If a location at which the fuse terminals 13 have not been appropriately inserted is found, the worker can easily fix it using a predetermined tool through the gap S.

Figure 6:
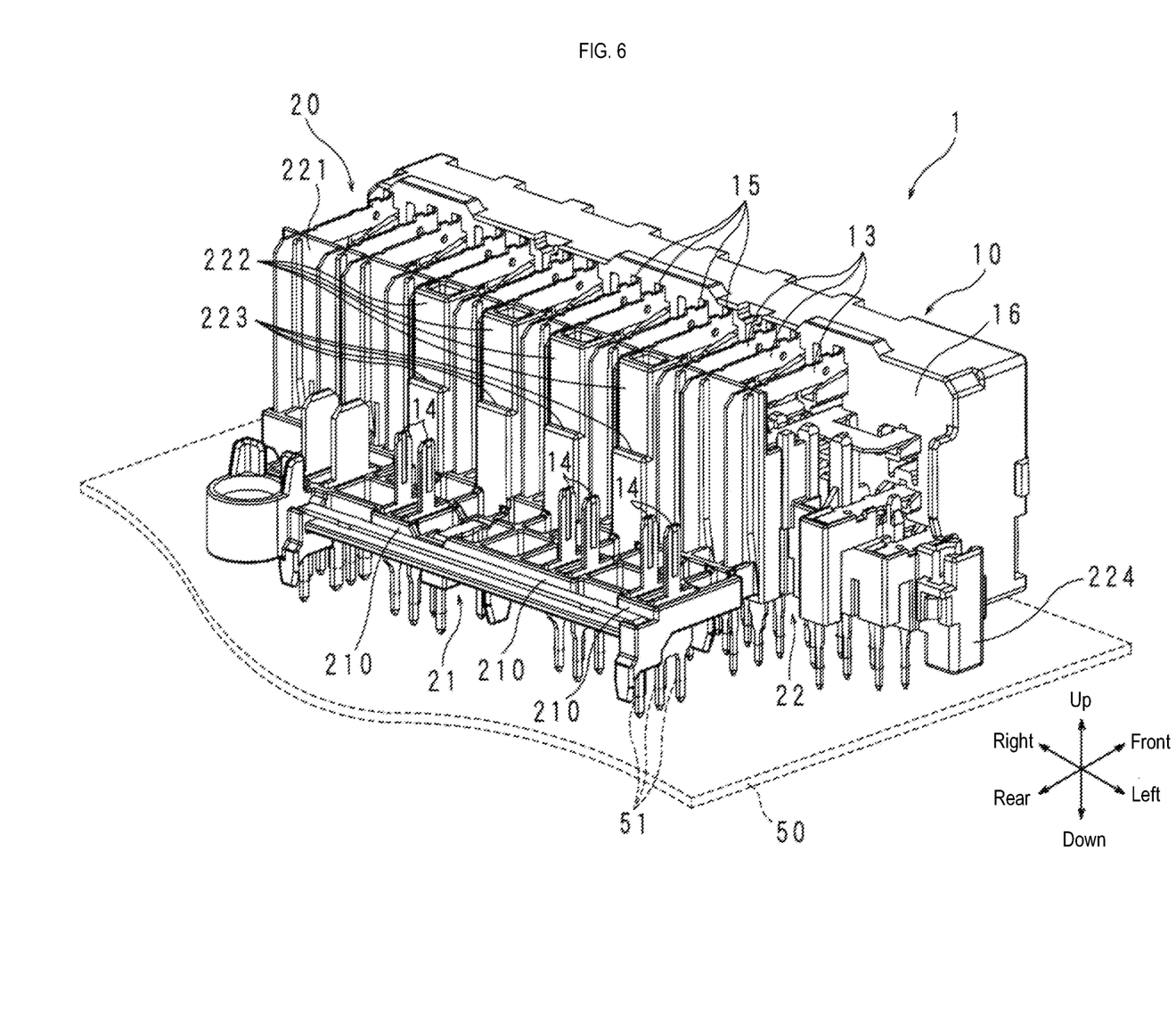
FIG. 6 is a perspective view showing a rear side of a fuse module of the electrical connection box according to the present embodiment.
Figure 7:
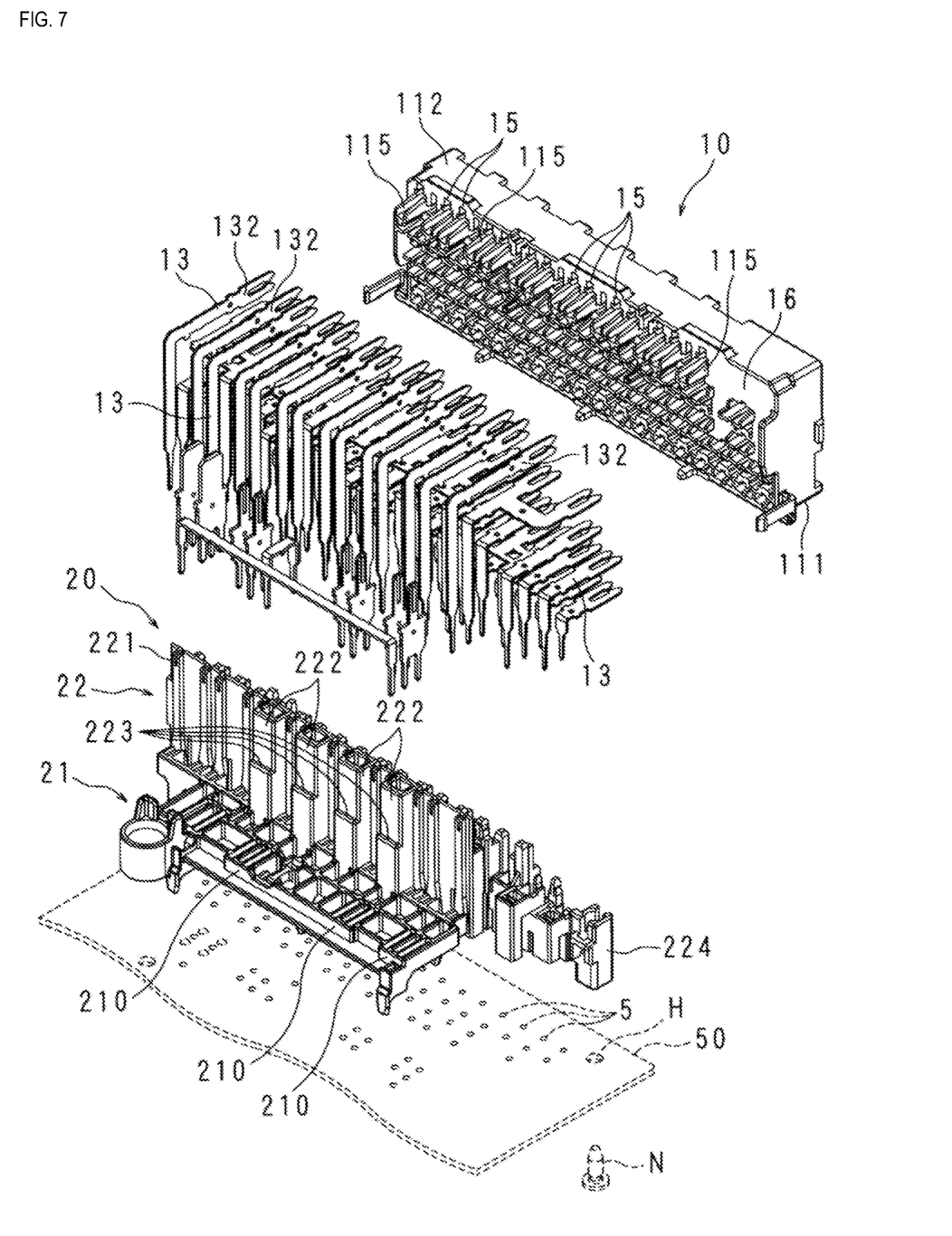
FIG. 7 is an exploded view of the fuse module of the electrical connection box according to the present embodiment.

FIG. 6 is a perspective view showing the rear side of the fuse module 1 of the electrical connection box 100 according to the present embodiment, and FIG. 7 is an exploded view of the fuse module 1 of the electrical connection box 100 according to the present embodiment. In FIG. 6, for the sake of convenience in the description, the substrate 50 is indicated by a broken line.

In the insertion housing 10, multiple through holes 15 into which end portions 132 on one side of the fuse terminals 13 are to be inserted are formed in the rear surface 16 (opposite-side surface) on the side opposite to the open port 11. The through holes 15 allow the inside and outside of the insertion housing 10 to be in communication. The end portions 132 on one side of the fuse terminals 13 are inserted into the insertion housing 10 via the through holes 15.

Also, near the through holes 15, the rear surface 16 is provided with guide portions 115 that guide the insertion of the fuse terminals 13 into the through holes 15. The guide portions 115 are approximately gutter-shaped, and are provided protruding from the rear surface 16 to the holding member 20. The multiple guide portions 115 are provided side by side in the lengthwise direction of the rear surface 16. Accordingly, during work for assembling the electrical connection box 100, a worker can easily insert the end portions 132 on one side of the fuse terminals 13 into the through holes 15 by using the guide portions 115.

The fuse terminals 13 are composed of thin plate materials made of a conductive metal. The fuse terminals 13 have bent portions at intermediate locations, and for example, are approximately L-shaped. As described above, the end portions 132 on one side of the fuse terminals 13 are inserted into the through holes 15 of the rear surface 16. In some of the multiple fuse terminals 13, the end portions 132 on one side are divided into two. The end portions 132 on one side of the fuse terminals 13 are connected to the second fuses F inserted into the insertion housing 10. Also, the end portions on the other side of the fuse terminals 13 are bent downward, that is, toward the substrate 50, are inserted into the through holes 51 of the substrate 50, and are connected to the substrate 50 through soldering, for example.

The fuse terminals 13 inserted into the insertion holes 12 of the uppermost second insertion hole row R2 (hereinafter referred to as "fuse terminals 13 of the second insertion hole row R2") are provided such that their two main surfaces, which have large areas, face leftward or rightward. In other words, the thickness directions of portions on one side with respect to the bent portions and the thickness directions of portions on the other side with respect to the bent portions are parallel in the fuse terminals 13 of the second insertion hole rows R2.

On the other hand, the fuse terminals 13 inserted into the insertion holes 12 of the first insertion hole rows R1 are provided such that the side surfaces adjacent to the main surface face leftward or rightward. In other words, the thickness directions of portions on one side with respect to the bent portions and the thickness directions of portions on the other side with respect to the bent portions intersect each other in the fuse terminals 13 of the first insertion hole rows R1.

Note that the fuse terminals 13 of the second insertion hole row R2 are arranged behind and above the fuse terminals 13 of the first insertion hole rows R1. The rear surface 16 of the insertion housing 10 is rectangular, and the fuse terminals 13 of the second insertion hole row R2 are arranged side by side in the lengthwise direction of the rear surface 16.

The holding member 20 is composed of insulating plastic or the like and is arranged opposing the rear surface 16 of the insertion housing 10. The holding member 20 includes: a front-side portion 22 located toward the insertion housing 10; and a rear portion 21 located rearward with respect to the front portion 22.

The front portion 22 is a frame member having multiple holes formed in the up-down and left-right directions. Also, the front portion 22 includes a holding plate 221 for holding the fuse terminals 13 of the second insertion hole row R2.

Multiple notches are formed on the upper end portion of the holding plate 221, and the fuse terminals 13 of the second insertion hole rows R2 are held due to the notches engaging with the fuse terminals 13 of the second insertion hole row R2.

The rear surface of the holding plate 221 is provided with gripping portions 222 that are used for gripping the fuse module 1. The gripping portions 222 are provided between the fuse terminals 13 of the second insertion hole row R2 and have quadrangular tube shapes. The gripping portions 222 extend in a direction intersecting the substrate 50, that is, in the up-down direction. For example, the gripping portions 222 are provided at four locations in the center of the holding body 20 in the direction in which the fuse terminals 13 of the second insertion hole row R2 are provided side by side, that is, in the lengthwise direction of the rear surface 16 of the insertion housing 10. Four gripping portions 222 are provided side by side in the direction in which the fuse terminals 13 of the second insertion hole row R2 are provided side by side.

The present embodiment is not limited thereto, and the gripping portions 222 may also be provided at three or fewer locations, or at five or more locations.

Thus, the gripping portions 222 are provided only in the center of the holding body 20 in the lengthwise direction (left-right direction) of the fuse module 1 in the electrical connection box 100 according to the present embodiment. Accordingly, even if the gripping portions 222 are not provided in a wide range, a worker can efficiently grip the fuse module 1 during assembly work for the electrical connection box 100.

The gripping portions 222 are provided only at the center, and the gripping portions 222 are tube-shaped. Accordingly, it is possible to achieve a lighter weight of the electrical connection box 100 according to the present embodiment.

In the electrical connection box 100 according to the present embodiment, the gripping portions 222 are interposed between the fuse terminals 13 of the second insertion hole row R2. Also, the gripping portions 222 protrude rearward with respect to the fuse terminals 13 of the second insertion hole row R2 in the direction in which the insertion housing 10 and the holding body 20 oppose each other, that is, in the front-rear direction.

This makes it possible to prevent a worker from erroneously touching the fuse terminals 13 of the second insertion hole row R2 and the other electrical components when gripping the fuse module 1, in the electrical connection box 100 according to the present embodiment. Accordingly, it is possible to prevent the occurrence of an inconvenience such as the fuse terminals 13 of the second insertion hole row R2 and the other electrical components deforming or becoming contaminated due to contact with a hand of the worker.

Also, finger placement portions 223 are formed on the rear-side outer surfaces of the gripping portions 222. Specifically, on the rear-side outer surfaces of the gripping portions 222, level differences in which the dimension of the gripping portion 222 increases in the direction (front-rear direction) in which the insertion housing 10 and the holding member 20 face each other are provided at an intermediate portion in the vertical direction, that is, the up-down direction of the gripping portions 222. The level differences serve as the finger placement portions 223.

A worker who grips the fuse module 1 can recognize the position to grip using the finger placement portions 223.

The rear portion 21 on the rear side with respect to the front portion 22 is a grid-shaped frame member. The rear portion 21 includes multiple inner-fitting holding portions 210 that hold the FL terminals 14 for connecting the first fuses and the substrate 50. The multiple inner-fitting holding portions 210 are configured such that two slits 211 form a pair. The inner-fitting holding portions 210 hold the FL terminals 14 such that the FL terminals 14 extend in a direction intersecting the substrate 50, that is, in the lengthwise direction of the gripping portions 222.

Fixing portions 224 for fixing the holding body 20 to the substrate 50 are provided on both ends of the front portion 22 in the direction in which the gripping portions 222 are provided side by side. The fixing portions 224 have tube shapes with screw holes formed inside.

Through holes H that penetrate through the substrate 50 in the thickness direction are formed in the substrate 50. During assembly of the electrical connection box 100, the worker screws screws N into the fixing portions 224 through the through holes H. Thus, the holding member 20 is fixed to the substrate 50.

The embodiment disclosed herein is illustrative in all respects, and is not to be construed as limiting. The scope of the present disclosure is defined not by the above-described meaning, but by the claims, and meanings equivalent to the claims and all modifications within the claims are intended to be included.

What is claimed is:

1. An electrical connection box for a vehicle, including an insertion housing that has a rectangular open port on one side and in which a plurality of rectangular insertion holes into which fuses are to be respectively inserted are provided facing the open port, the electrical connection box comprising:
    a substrate arranged opposing one wall portion surrounding the open port is included outside of the insertion housing;
    a first insertion hole row in which a plurality of the insertion holes are provided side by side in a lengthwise direction of the open port, with long sides of the insertion holes adjacent to each other; and
    a second insertion hole row in which a plurality of the insertion holes are provided side by side in the lengthwise direction of the open port, with short sides of the insertion holes adjacent to each other, wherein the first insertion hole row is provided at a position close to the substrate and the second insertion hole row is provided at a position far from the substrate.

2. The electrical connection box according to claim 1, comprising:
    through holes that are provided in an opposite-side surface of the insertion housing that is on a side opposite to that of the open port, and allow the inside and outside of the insertion housing to be in communication;
    a plurality of fuse terminals that have end portions on one side inserted into the insertion housing through the through holes, and that connect the fuses to the substrate; and
    guiding portions that are provided on the opposite-side surface and are configured to guide insertion of the fuse terminals.

3. The electrical connection box according to claim 1, comprising
    a flat plate portion that covers another wall portion opposing the one wall portion of the insertion housing,
    wherein in a short direction of the open port, a distance from the other wall portion to the flat plate portion is shorter than a distance from the one wall portion to the substrate.

* * * * *